（12) United States Patent
Edmond

(10) Patent No.: US 8,609,986 B2
(45) Date of Patent: Dec. 17, 2013

(54) CABLE RACEWAY

(75) Inventor: George Edmond, Yatton (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/346,842

(22) Filed: Jan. 10, 2012

(65) Prior Publication Data

US 2012/0193120 A1 Aug. 2, 2012

(30) Foreign Application Priority Data

Jan. 28, 2011 (GB) .................................. 1101469.3

(51) Int. Cl.
*H02G 3/04* (2006.01)
(52) U.S. Cl.
USPC .......... 174/68.1; 174/72 R; 174/95; 248/68.1; 439/207
(58) Field of Classification Search
USPC ............ 174/480, 481, 68.1, 68.3, 72 A, 72 R, 174/88 R, 70 C, 95, 100; 248/68.1, 74.1, 248/74.2, 74.3; 385/134, 135; 439/207, 439/209, 208, 210; 52/220.1, 220.7, 220.8
See application file for complete search history.

(56) References Cited

U.S. PATENT DOCUMENTS

| 3,890,459 | A | * | 6/1975 | Caveney | 174/101 |
| 5,149,026 | A | * | 9/1992 | Allen | 248/68.1 |
| 5,622,341 | A | * | 4/1997 | Stana | 248/74.1 |
| 5,898,134 | A | * | 4/1999 | Fallin et al. | 248/74.1 |
| 6,641,092 | B1 | | 11/2003 | Adam et al. | |
| 6,693,238 | B2 | | 2/2004 | Jadaud et al. | |
| 7,537,477 | B2 | * | 5/2009 | Crossman et al. | 248/74.1 |
| 8,356,778 | B2 | * | 1/2013 | Birli et al. | 248/74.2 |

FOREIGN PATENT DOCUMENTS

| DE | 10031692 A1 | 1/2002 |
| EP | 1229624 A1 | 8/2002 |
| EP | 1744424 A1 | 1/2007 |
| FR | 2799896 A | 4/2001 |
| FR | 2925781 A1 | 6/2009 |
| GB | 2314903 A | 1/1998 |
| WO | 0235670 A1 | 5/2002 |

OTHER PUBLICATIONS

Search Report for GB 1101469.3 dated May 24, 2011.

* cited by examiner

*Primary Examiner* — Angel R Estrada
(74) *Attorney, Agent, or Firm* — Lowe Hauptman & Ham, LLP

(57) ABSTRACT

A cable raceway assembly is provided having channel sections with protrusions and clamp insertable with recesses engageable with the protrusions provide a snap-fit ratchet-type engagement.

12 Claims, 3 Drawing Sheets

CABLE RACEWAY

RELATED APPLICATIONS

Figure 1:
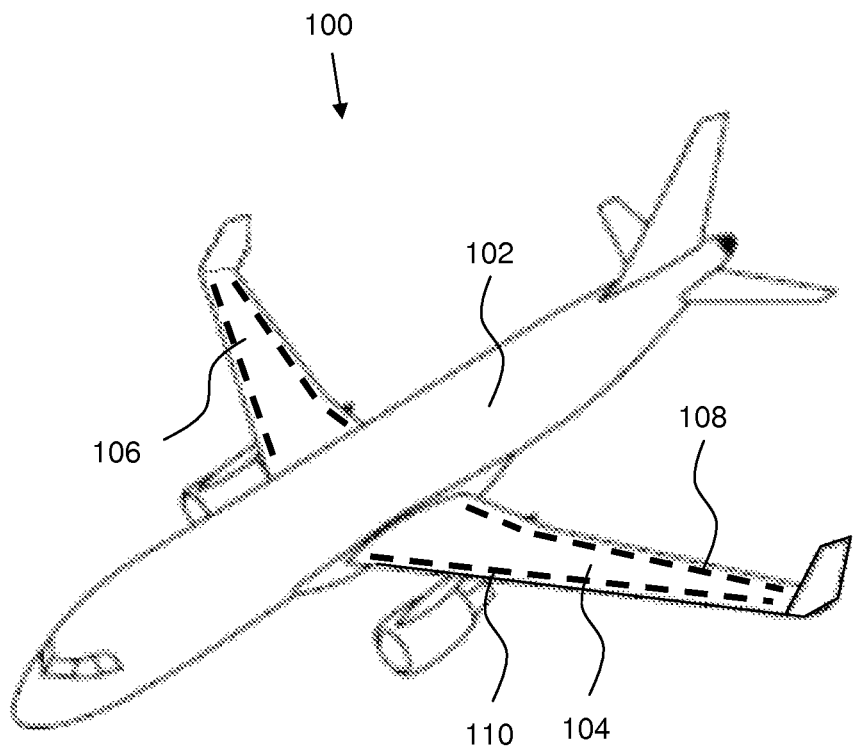

The present application is based on, and claims priority from, British Application No. 1101469.3, filed Jan. 28, 2011, the disclosure of which is hereby incorporated by reference herein in its entirety.

The present invention is concerned with a raceway for routing electrical cables. More specifically, the present invention is concerned with a clamping method and apparatus and associated raceway for routing cables within an aircraft.

Cable raceways are known in the aerospace sector and are generally used for routing cables from one point to another within the aircraft. Traditional cable raceways are constructed by extruding aluminium into elongate channel shapes containing one or more individual u-shaped channels in which cables are held. In order to secure the cables in position, a number of discrete, small holes are formed in the base of the channels. A tie harpoon is passed from the underside of the channel such that it extends towards and through the channel mouth. The harpoon is held in place by a head which abuts the underside of the channel wall.

Once cables have been placed within the channel (on either side of the tie harpoon) a pad is placed on top of the bundled cables. The free end of the tie harpoon passes through a bore in the pad. A retainer is then placed on top of the pad to retain it and the cables in place. The retainer is mechanically coupled to the tie harpoon such that it applies a compressive force to the pad and cables. In the final stage of assembly, the part of the tie harpoon which projects from the cable raceway is cut to a flush finish.

It will be noted that the above-described prior art approach has several disadvantages. Firstly, the cables can only be clamped in discrete positions depending on where the holes are formed in the base of the cable raceway. Positioning of many such holes results in a reduction of strength of the cable raceway and increases the cost of the manufacturing process.

A second disadvantage is that the tie harpoon needs to pass through the centre of the raceway itself which leaves less space for the cables and can interfere with their positioning. A further disadvantage of the above mentioned method is that at least three components are required (tie harpoon, the pad and the retainer) which increases the complexity and cost of assembly due to the high part count.

A still further disadvantage of the above mentioned method is that the tie harpoon must also be trimmed adding a further step to the assembly process.

In conclusion, the above mentioned method is time consuming, costly and involves a significant part count and manufacturing resource.

It is an aim of the present invention to overcome or at least mitigate at least one of the above mentioned problems.

According to the present invention there is provided a cable raceway comprising an elongate channel section for receiving a cable, the channel section having a first and a second sidewall, wherein each sidewall defines a first and a second protrusion respectively, each protrusion projecting towards the opposite sidewall, and a clamp positionable at least partially within the channel, the clamp arranged to engage the first and second protrusions to retain the clamp in a first position.

Advantageously, the position of a clamp which interacts with the structure of the channel section of the raceway itself eliminates the use for any further components to hold it in place. In particular, by using the above apparatus, only a single clamping component is required.

Preferably, the protrusions are integral with the sidewalls. The protrusions may each be semi-circular in cross section thus forming cylindrical formations integral with the sidewalls.

Preferably, the clamp defines a first and a second recess arranged to receive the first and second protrusion respectively. More preferably, the clamp defines a further first recess and a further second recess such that the clamp is positionable in a second position further into the channel.

Advantageously, the clamp can be adjusted to the desired height with respect to the base of the channel section and an appropriate clamping force can be applied depending on the number and size of the cables in the channel.

The sidewalls may be resiliently deformable to snap-fit the clamp into the first and/or second position. Alternatively, the clamp is resiliently deformable to snap-fit into the first or second position. The clamp may define a slot extending in a direction transverse to the recesses in an insertion direction of the clamp in order to make it inherently flexible.

Advantageously, the provision of a snap-fit deformable system eliminates the need for complex mechanical locking arrangements as seen in the prior art.

The protrusions should preferably extend along at least 80 percent of the length of the raceway, more preferably at least 90 percent, eve more preferably at least 95 percent and most preferably, the protrusions are elongate and oriented along the entire length of the channel section.

Preferably, the clamp defines grooves oriented in the same direction as the protrusions in use such that the clamp can be selectively positioned along the length of the protrusions.

Advantageously, these features permit the clamp to be positioned at any point along the channel section and the positioning of such clamps is not predetermined by discrete features (such as the holes of the prior art).

Preferably, a slot interrupts the grooves of the clamp to form additional groove edge regions. Advantageously, this increases the gripping force of the clamp on the side walls of the cable raceway.

Preferably the clamp defines a contact face, more preferably the contact face is parallel to the base of the channel section in use such that it can evenly clamp cables therebetween.

Preferably, the clamp comprises a body and a contact pad positioned to contact a cable within the channel in use which contact pad is constructed from elastomeric material. By providing an attached contact pad the assembly process is made less complicated as the clamp contains an integrated resilient member for contact with the wires. The resilient contact pad will also ensure that the clamp is securely fastened within the cable raceway.

Preferably, the clamp comprises a tapered portion at an insertion end. Advantageously, this will aid assembly of the clamp into the cable raceway.

Preferably, the clamp comprises a cap end having a cross channel width in use which cross channel width is wider than the channel section to limit insertion of the clamp. This prevents the clamp being inserted too far into the cable raceway.

According to a further aspect of the invention there is provided a cable raceway having a plurality of elongate channel sections and associated clamps according to the first aspect.

Figure 2:
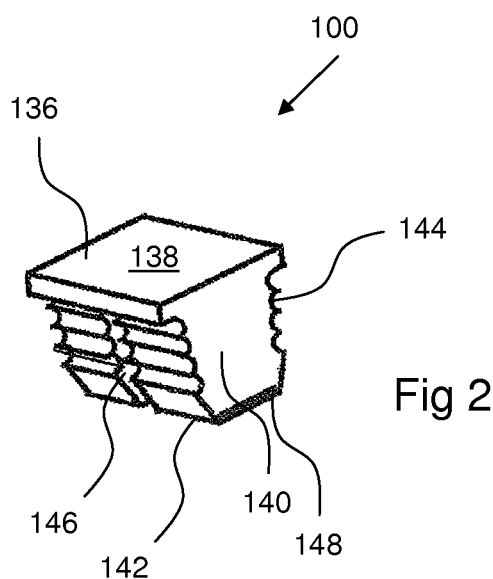
Figure 3:
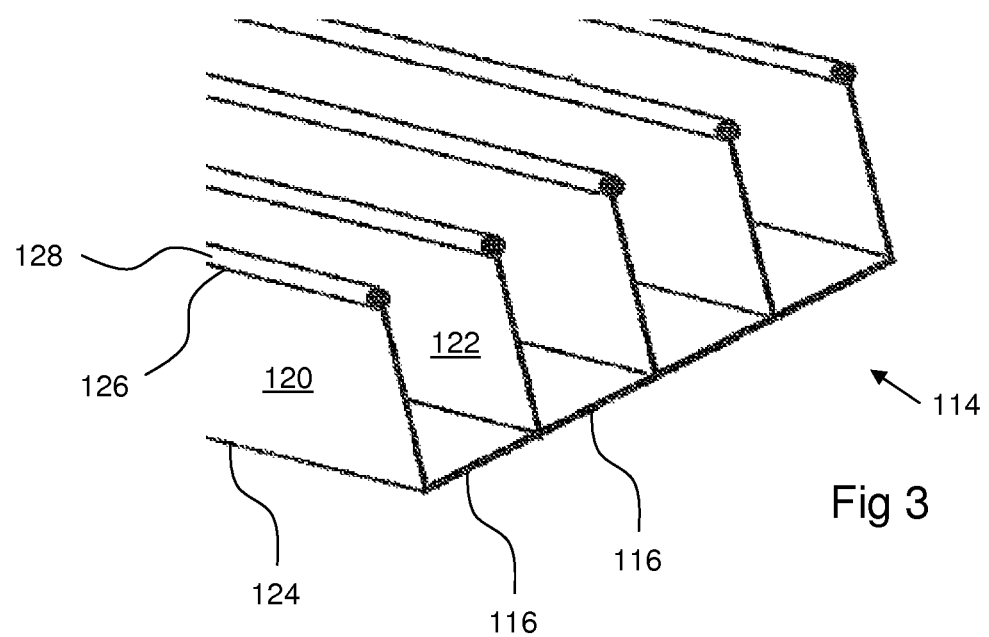
Figure 4:
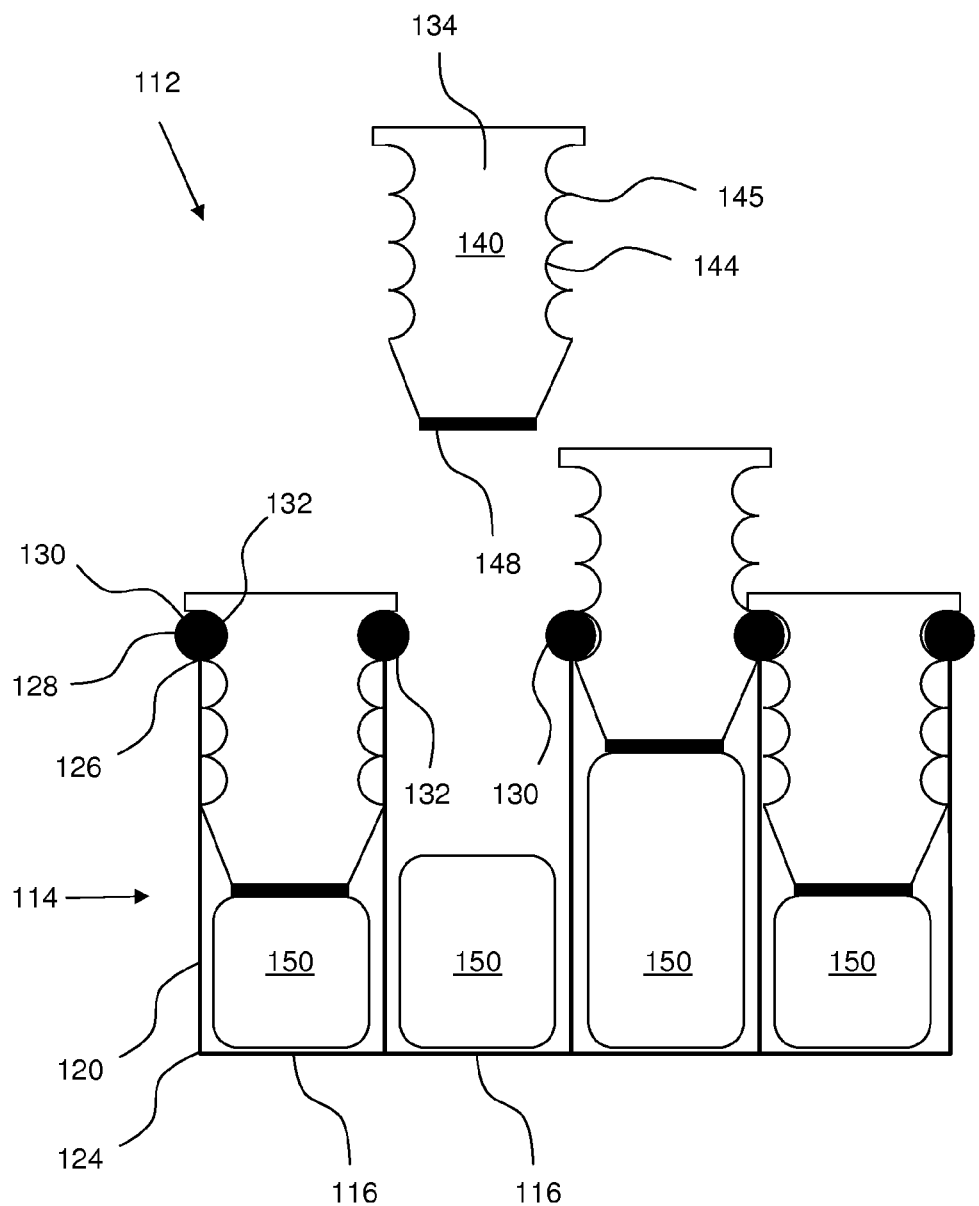

An example cable raceway in accordance with the present invention will now be described with reference to the accompanying figures in which:

FIG. 1 is a perspective view of an aircraft comprising a cable raceway according to the present invention, FIG. 2 is a perspective view of a clamp according to the present invention, FIG. 3 is a perspective view of a cable raceway according to the present invention; and FIG. 4 is a cross-section view of the cable raceway of FIG. 3 and four of the clamps of FIG. 2 in an assembled condition.

Referring to FIG. 1, there is provided an aircraft 100 having a fuselage 102, a left wing 104 and a right wing 106. A first cable raceway assembly 108 is provided extending from the fuselage 102 to the tip of the wing 104 along the trailing edge. A second cable raceway assembly 110 is positioned at the leading edge of the wing 104 and extends from the fuselage 104 to the wing tip. The cable raceway assemblies 108, 110 carry power and data cables to various components within the wing 104 such as the fuel systems and lighting systems. It will be noted that similar cable raceways are found in the right hand wing 106.

Turning to FIGS. 2 to 4, a cable raceway assembly 112 according to the present invention is shown. The assembly 112 comprises a cable raceway 114 having a plurality of channel sections 116. Each of the channel sections 116 has a base 118, a first side wall 120 and a second side wall 122 forming a u-shape.

Each of the side walls 120, 122 are identical and, as such, only side wall 120 will be described in detail here. Side wall 120 has first end 124 at which it joins the base 118 and a second end 126 which is free. The second end 126 partly defines a mouth of the channel section 116.

At the second end 126, a cylindrical lug 128 is formed comprising a first semi-cylindrical projection 130 projecting in a first direction from the wall 120 and a second semi-cylindrical projection 132 projecting from a second opposite side of the wall 120. As such, within each channel semi-cylindrical protrusions 130, 132 project towards each other (i.e. towards the opposite wall).

The cable raceway assembly 112 further comprises a plurality of identical clamps 134.

The clamp 134 comprises a body 136 having a planar portion 138 and a downwardly projecting finger 140 terminating in an insertion end 142. On the opposite sides of the finger 140 a plurality of elongate, semi-cylindrical recesses 144 are defined which extend the length of the clamp body 136. Ridges 145 defined between the recess 144 are interrupted along their length by a slit 146 extending in an insertion direction transverse to the direction of the recesses 144.

The insertion end 142 of the finger 140 is inwardly tapered and comprises a pad 148 adhered thereto and constructed from a resilient material such as an elastomer.

In use, a cable bundle 150 is inserted into the channel section 116. The clamp 134 is then pushed between the side walls 120, 122 with the insertion end 142 leading. The width of the finger 140 is such that the ridges 145 between the recesses 144 ride over the facing protrusions 130, 132. The small individual ridges 145 defined between each recess 144 ride over the protrusions in order to provide a snap-fit ratcheting type motion of a the clamp in a downward direction. The clamp 134 is pushed into the channel 116 until the cable bundle 150 is securely clamped in position.

It will be noted that the slit 146 provides additional edge regions to enable the body 134 to grip the sides of the side walls 120, 122.

It will be noted that the planar portion 138 ensures that the clamp 134 cannot be completely inserted into the channels 116.

Variations of the above embodiment fall within the scope of the present invention.

For example, the protrusions 130, 132 may be any suitable shape and do not have to be disposed at the free end of the side walls 120, 122. They may be positioned part-way down.

The invention claimed is:

1. A cable raceway comprising:
   a first sidewall;
   a second sidewall; and
   a third sidewall, wherein:
   the first and second side wall defining a first elongate channel section for receiving a first cable; and
   the second and third side wall defining a second elongate channel section for receiving a second cable, wherein:
   the first sidewall defines a first protrusion unitary with the first sidewall oriented along substantially the entire length of the first channel section and projecting towards the second sidewall;
   the second sidewall defines a second protrusion unitary with the second sidewall oriented along substantially the entire length of the first elongate channel section and projecting towards the first sidewall;
   the second sidewall defines a third protrusion, opposite the second protrusion, and unitary with the second sidewall oriented along substantially the entire length of the second elongate channel section and projecting towards the third sidewall; and,
   the third sidewall defines a fourth protrusion unitary with the third sidewall oriented along substantially the entire length of the second elongate channel section and projecting towards the second sidewall;
   the cable raceway further comprising:
   a first clamp positionable at least partially within the first elongate channel section:
   and
   a second clamp positionable at least partially within the second elongate channel section;
   wherein each clamp defines:
   a contact face for securing a cable within the respective elongate channel section,
   a first and a second recess arranged to receive respective protrusions such that the clamp is positionable in a first position, and;
   a further first recess and a further second recess such that the clamp is positionable in a second position.

2. A cable raceway according to claim 1, in which the first, second and third sidewalls are resiliently deformable to snap fit the clamp into the first and/or second position.

3. A cable raceway according to claim 1, in which the clamp is resiliently deformable to snap fit into the first and/or second position.

4. A cable raceway according to claim 3 in which the clamp defines a slot extending in a direction transverse to the recesses in an insertion direction of the clamp.

5. A cable raceway according to claim 1, in which the recesses are grooves oriented in the same direction as the protrusions in use such that the clamp can be selectively positioned along the length of the protrusions.

6. A cable raceway according to claim 5, in which a slot interrupts the grooves to form additional groove edge regions.

7. A cable raceway according to claim 1, in which the clamp comprises a body having a contact pad defining the contact face, which contact pad is constructed from an elastomeric material.

8. A cable raceway according to claim 1, in which the contact face is parallel to a channel base extending between the sidewalls in use.

9. A cable raceway according to claim 1, in which each sidewall comprises only one protrusion per side.

10. A cable raceway according to claim 1, comprising a base, in which the first, second and third sidewalls have a respective first and second ends, the sidewalls being connected to the base at respective first ends, in which the protrusions are proximate the second ends.

11. A cable raceway comprising:

an elongate channel section for receiving a cable, the channel section having a first and a second sidewall, wherein each sidewall defines a first and a second protrusion respectively, each protrusion orientated along the length of the channel section, substantially the entire length thereof, and;

a clamp positionable at least partially within the channel, in which the clamp defines:

a contact face for securing a cable within the channel section, a first and a second recess arranged to receive the first and the second protrusion respectively such that the clamp is positionable in a first position, and;

a further first recess and a further second recess such that the clamp is positionable in a second position, wherein the clamp comprises a tapered portion at an insertion end, which insertion end is insertable into the channel section.

12. A cable raceway comprising:

an elongate channel section for receiving a cable, the channel section having a first and a second sidewall, wherein each sidewall defines a first and a second protrusion respectively, each protrusion orientated along the length of the channel section, substantially the entire length thereof, and;

a clamp positionable at least partially within the channel, in which the clamp defines:

a contact face for securing a cable within the channel section, a first and a second recess arranged to receive the first and the second protrusion respectively such that the clamp is positionable in a first position, and;

a further first recess and a further second recess such that the clamp is positionable in a second position, wherein the clamp comprises a cap end having a cross-channel width in use, which cross-channel width is wider than the channel section to limit insertion of the clamp.

* * * * *